United States Patent [19]

Hoffmann et al.

[11] Patent Number: 5,286,690
[45] Date of Patent: Feb. 15, 1994

[54] METHOD OF HEAT EXCHANGE OF SOLID PARTICLES FOR REGENERATION IN CATALYTIC CRACKING

[75] Inventors: Frederic Hoffmann, Paris; Regis Bonifay, Asnieres, both of France

[73] Assignee: Institut Francais du Petrole, Reuil Malmaison, France

[21] Appl. No.: 870,862

[22] Filed: Apr. 20, 1992

[30] Foreign Application Priority Data

Apr. 26, 1991 [FR] France ................. 91 05282

[51] Int. Cl.⁵ .............. B01J 38/30; B01J 38/32; C10G 11/18; F27B 15/08
[52] U.S. Cl. .................. 502/41; 208/113; 208/164; 422/144; 502/44
[58] Field of Search ............. 502/40–44; 208/164

[56] References Cited

U.S. PATENT DOCUMENTS

| | | | |
|---|---|---|---|
| 2,735,802 | 2/1956 | Jahnig | 502/41 |
| 4,434,245 | 2/1984 | Lomas et al. | 502/2 |
| 4,614,726 | 9/1986 | Walters et al. | 502/41 |
| 4,615,992 | 10/1986 | Murphy | 502/43 |
| 4,923,834 | 5/1990 | Lomas | 502/41 |

Primary Examiner—Paul E. Konopka
Attorney, Agent, or Firm—Millen, White, Zelano, & Branigan

[57] ABSTRACT

The invention relates to a method of and an apparatus for fluidised bed regeneration of a catalyst containing coke.

The catalyst and some of the regeneration fumes are drawn off from the dense bed of a regenerator (1) and are introduced by gravity into an external exchanger at a junction point below the level of the dense bed of the regenerator. Heat exchange is carried out in the lower part of the exchanger (7) below the junction point. From the bottom end of the exchanger up to above the junction point a dense bed zone is created the level of which is established substantially at the height of the dense bed in the regenerator and a zone (15) of suitable size for the escape of regeneration gases and fluidisation gas. The gases and fumes are drawn off into the dilute fluidised phase (18) of the regenerator through a duct (17) while the catalyst is recycled to the dense bed of the regenerator through a different duct (25) from that in which the fluidisation air is circulating.

Application to the regeneration of fluid bed cracking catalysts.

12 Claims, 1 Drawing Sheet

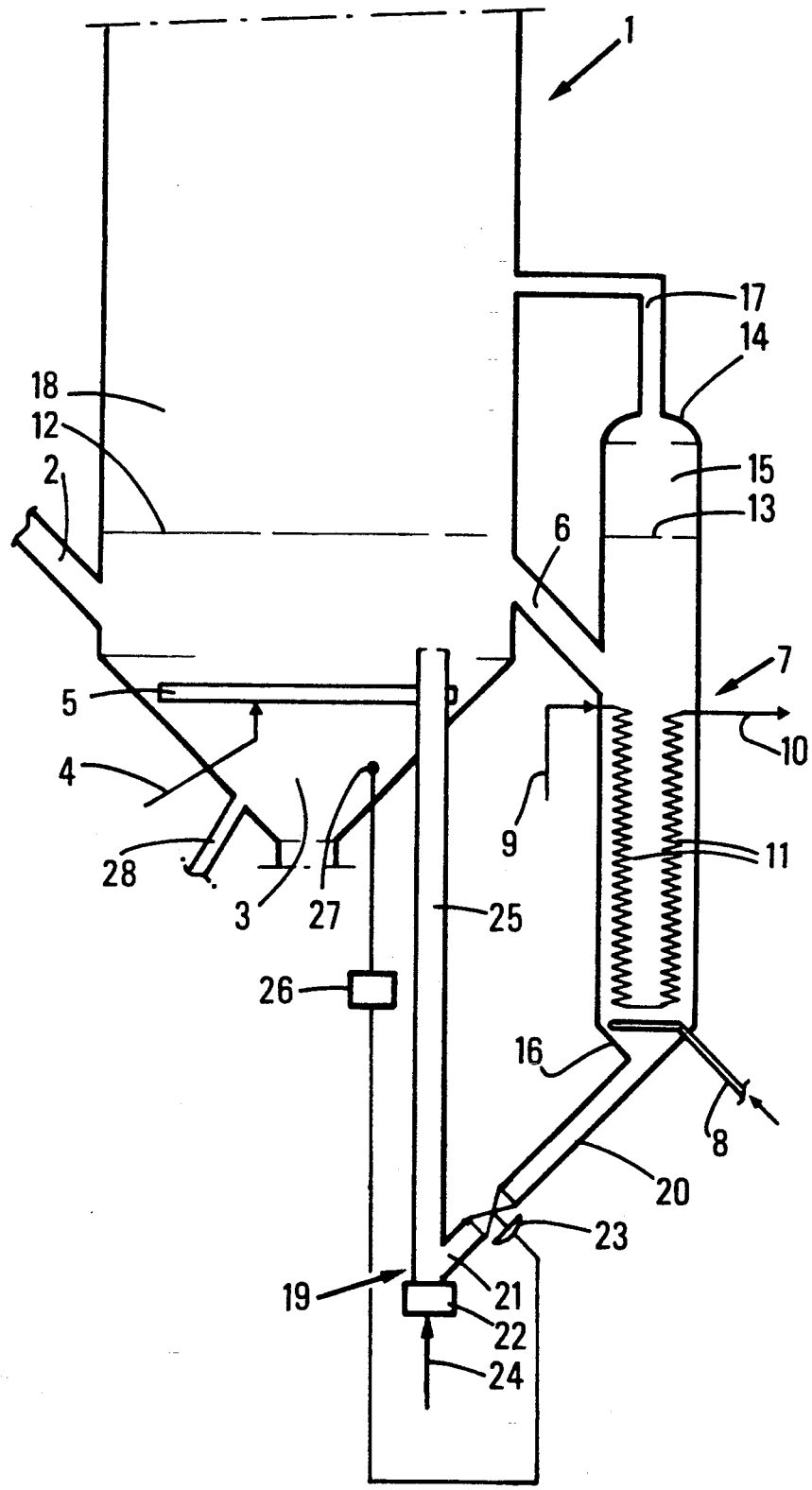

METHOD OF HEAT EXCHANGE OF SOLID PARTICLES FOR REGENERATION IN CATALYTIC CRACKING

BACKGROUND OF THE INVENTION

The invention relates to a method of regenerating a used catalyst with fluidized bed heat exchange and an apparatus for carrying out the method. More particularly, the method can be applied to the regeneration of catalysts contaminated with coke residues after reaction with a hydrocarbon batch. It may relate to hydroprocessing, hydrocracking or catalytic cracking, reforming catalysts or even any contact mass used for example in thermal cracking processes.

Purely by way of illustration, the process can be applied to the regeneration of used catalyst resulting from a catalytic cracking process conducted in a fluidized bed and involving heavy oil batches having a high Conradson carbon level, such as an atmospheric residue, a vacuum residue, a deasphalted residue, such residues being capable of being hydroprocessed.

The method of the invention is particularly applicable to the monitoring of temperature.

Catalytic cracking processes convert the hydrocarbon carbon charges to lighter products such as fuels. Initially, the charges were relatively light, diesel fuel for example, and in order to obtain maximum conversion efficiency with highly active zeolitic catalysts, it was necessary to remove the maximum of the coke which had become deposited on these catalysts, reducing their effectiveness, during a regeneration stage at a temperature of between 520° and 800° C.

The urgent demand for fuels is motivating refiners to turn their attention to increasingly heavier charges, containing hydrocarbons with a high boiling point, for example with a boiling point above 550° C. and having a high Conradson carbon level or a substantial concentration of metals. Heavy hydrocarbons and coke can then become deposited on the catalyst in a substantial quantity during the catalytic cracking phase and regeneration by combustion may result in a considerable release of heat which may damage the apparatus and deactivate the catalyst, particularly in the event of prolonged exposure to temperatures higher than 800° C. It then becomes vital to monitor catalyst regeneration. This problem occurs particularly when it is desired to apply to a long-standing, technology dealing essentially with conventional hydrocarbon charges to a method which involves much heavier charges.

One of the objects of the invention therefore is to propose a regeneration process and an apparatus comprising the monitoring of cooling of the catalyst in a catalytic cracking unit with a view to processing heavy charges.

Another object of the invention is to provide for much greater flexibility of use of the apparatus.

The prior art is illustrated by the following patents:

U.S. Pat. No. 4,614,724 discloses an apparatus embodying a regenerator, the regeneration temperature of which is controlled by an external heat exchanger in which the flow passes downwardly through a nest of tubes.

The cooled catalyst is recycled to the generator via a duct through which catalyst ascends in a fluidized state into the dense bed of the regenerator. The catalyst in the exchanger is maintained in dense bed by a fluidizing gas flowing counter-current to the direction of flow of the catalyst and the fluidizing gas is either entrained with it when the rate of flow is very low or is discharged through the catalyst line. This counter-current circulation of the gas disturbs the flow of catalyst in the inlet connector and in the exchanger and the heat exchange efficiency is therefore not at its maximum.

U.S. Pat. No. 4,434,245 describes a two-level regenerator comprising an external exchanger with lateral intake of hot catalyst emanating from the upper level which is a storage zone.

The cooled catalyst is recycled via a duct receiving the regenerating air and the used catalyst, into a zone corresponding to the lower level where combustion takes place. Therefore, operation of the regenerator and of the exchanger is closely linked since the return of cooled catalyst to the regenerator is a function of the rate of flow of fluidization of the air used for regeneration and which circulates within the said duct. Furthermore, this patent discloses a connector above the exchanger and which discharges into the dense bed of the exchanger so that the release of gas and fumes can only take place partially, taking into account the presence of the catalyst in this connector. There may then be a phenomenon of circulation of catalyst with a return flow through the top (backmixing). Clearance of gas is all the poorer since the nest of exchange tubes reaches as far as the top end of the exchanger. Mixing is not necessarily homogeneous and there is therefore an upper zone where the catalyst stagnates and where it is only poorly renewed, so that heat exchange is diminished.

U.S. Pat. No. 4,923,834 describes a "backmixing" process in which an upper connector discharging into the inlet duct of the exchanger containing catalyst which circulates in a dense bed, makes it possible for catalyst to return from the exchanger into the storage chamber of the regenerator. Here, therefore, there is cooling by "backmixing" and not a solution to a problem of evacuation from a heat exchanger of fumes and fluidizing air which would make it possible to maximise heart exchange.

SUMMARY OF THE INVENTION

The present invention remedies the aforementioned drawbacks and makes it possible to obtain substantially improved results.

To be more precise, the invention relates to a method for the fluidized bed regeneration of a catalyst contaminated by the coke deposited on it, characterised by the following stages:

(a) in at least one regeneration zone and under appropriate conditions, dense bed regeneration of the contaminated catalyst and of the at least partially cooled catalyst from stage f) below are regenerated in the presence of a regenerating gas containing oxygen;

(b) at least a part of the catalyst contained in the regeneration zone and some of the fumes are passed through a downwardly inclined duct into an external heat exchanging zone of suitable height, the said duct connecting the dense bed of the regeneration zone to the heat exchange zone into which it discharges at a junction which is so disposed that, from the bottom end up to the top of the said junction, a dense bed of catalyst becomes established substantially as far as the level of catalyst in the regeneration zone and also a clearance zone offering suitable space above the said dense bed as far as the top end of the exchange zone, (c) the catalyst is cooled in at least a part of the said dense bed zone under adequate fluidization and indirect heat exchange conditions, in the presence of fluidizing gas containing oxygen, the catalyst circulating downwardly in counter-current to the direction of flow of the fluidising gas, (d) the procedure involves separation of the catalyst and fluidizing gas as well as any regeneration fumes in the said space of the clearance zone, (e) the said gases and fumes from stage d) are extracted from the clearance zone and are sent to the dilute phase above the dense bed of the regeneration zone and, (f) the cooled catalyst is recycled from the bottom part of the heat exchange zone to the dense bed of the regenerator by a counter-current injection of fluidizing gas containing oxygen.

The invention offers the advantage of great flexibility in use. By connecting the degassing line to the zone for clearing the fumes and gases from catalyst fluidization in the upper part of the exchanger, providing adequate space well above the level of the dense bed, the flow of catalyst around the nest of exchanger tubes is encouraged. Furthermore, the entire flow of the catalyst, which can be increased to meet the conditions of thermal balance in the unit according to the severity of the charge, flows through the exchanger and contributes to the improvement in heat exchange and so contributes to its control.

According to characteristic feature of the invention, the fluidization rate in the exchanger is generally 0.025 m/s to 0.75 m/s and advantageously 0.05 to 0.30 m/s. According to another characteristic feature, the rate of fluidizing in the regenerator is generally 0.6 to 1.5 m/s and is advantageously 0.8 to 1.2 m/s.

To allow of satisfactory clearance of the fluidizing gas and the fumes from regeneration of the catalyst, the general rule is to choose an exchanger the height of which is such that the space available for fluidizing gas clearance corresponds to a height of 0.1 to 5 m and preferably 1 to 2.5 m above the level of the dense bed in the regeneration zone.

The gases and fumes may be drawn of off from the clearance zone at a rate of 2 to 15 m/s and advantageously 5 to 8 m/s.

The diameter of the extraction connector is usually such that the loss in head is limited and is for instance 0.1 bars. This corresponds to a ratio of diameter of the inlet connector of the catalyst and the gas draw-off connector which is normally less than or equal to 10, being for instance comprised between 3 and 6.

According to an advantageous embodiment, substantially all the indirect heat exchange may be carried out below the junction point of the inclined duct for feeding hot catalyst into the heat exchanger. Under these conditions, heat exchange is maximized since the total surface area of the exchanger is in contact with all the catalyst circulating therein.

Control of the flow of catalyst passing through the exchanger and thus thermal control of regulation is usually provided by a valve at the outlet from the exchanger and upstream of the accelerated rise of cooled catalyst into the dense bed. Generally, this valve is controlled by suitable control means which work in liaison with a temperature probe disposed either in the dense bed or in the fluidized bed of the regenerator and which generally continuously compare the temperature signal with a reference signal previously defined as a function of the parameters of regeneration and of the type of charge.

BRIEF DESCRIPTION OF THE DRAWING

The drawing is a schematic elevational view of a preferred embodiment of the apparatus of the invention.

DETAILED DESCRIPTION OF THE INVENTION

The invention also relates to an apparatus for the fluidized bed regeneration of a catalyst contaminated by coke and comprising inlet means (2) for catalyst and outlet means (28) for regenerated catalyst which is passed to a reactor. It comprises in combination:

a/ an elongate regeneration enclosure (1) connected to the said inlet means (2) and containing a dense bed (3) of catalyst and means (4, 5) of injecting a regenerating gas into the said dense bed, b/ an external vertical heat exchanger (7) of elongate form, of a suitable height and adapted to receive the hot catalyst and part of the fumes through an inclined duct (6) connecting the said dense bed of the regenerating enclosure to the exchanger and adapted to cool it while it is circulating through the exchanger in a descending direction, the said exchanger comprising means (8) of fluidising the catalyst by a gas at its bottom end adapted to create therein a dense bed at an appropriate level, the said inclined duct (6) discharging into the exchanger (7) at a junction point situated below the level (12) of the dense bed in the regenerating enclosure (1) at a distance from the upper end thereof such that it permits separation of any regeneration fumes and fluidizing gas from the catalyst in the upper part of the exchanger or clearance zone situated above the level of the dense bed in the exchanger, c/ means (17) of drawing off fumes and fluidising gas from the clearance zone in the upper part of the exchanger, connected to the regenerating enclosure (1) at a point above the level (12) of the dense bed of catalyst, d/ recycling means (20, 25) adapted for generally ascending circulation of the cooled catalyst from the bottom end of the exchanger to the said dense bed of the regenerating enclosure and comprising means (22) for raising catalyst cooled by a fluidizing gas containing oxygen.

The junction point of the inclined duct at heat exchanger level is situated at a distance from the top end of the exchanger which is comprised between one-quarter and one-half the total height and preferably between one-quarter and one-third of the height.

The heat exchangers may be of a per se known type and are generally constituted by nests of tubes which indirectly exchange heat with the catalyst (coiled tubes, U-shaped, bayonet or hairpin tubes). The catalyst can circulate therein either on the inside or on the outside. The wall of the heat exchanger may possibly have a tube-diaphragm surface.

The catalyst regenerated according to the invention is likewise of conventional type such that the zeolitic type silicas-aluminas generally and advantageously have a particle size of 30 to 100 micrometers.

The invention will be more clearly understood from the drawing illustrating the process and the apparatus A regenerator 1 emanating from a catalytic cracking unit receives through a line 2 and emanating from a stripper separator, not shown, zeolitic catalyst on which coke has become deposited during the reaction of catalytic cracking. This line discharges into the catalytic bed 3 at a suitable location. A regenerating gas containing oxygen is carried through a line 4 into a fluidizing means 5 such as a grid or ring and allows dense bed fluidization of the catalyst and the combustion of the coke in a continuous fashion. The regenerating fumes and the catalyst entrained therein are separated in cyclones not shown in the drawings and the regeneration fumes are for the most part extracted.

A part of the heated catalyst and a part of the fumes at a temperature of 600° to 850° C. are drawn off from the dense bed 3 at a point situated above the air injection device 5 and are conveyed by gravity, thanks to a downwardly inclined duct 6, inclined for instance at 30 to 60 degrees in respect of the axis of the exchanger, into a heat exchanger 7 adapted to perform indirect heat exchange. This exchanger is vertical cylindrical and elongated and it contains a nest of exchanger tubes consisting of coiled tubes 11 in which a suitable fluid such as pressurised water can circulate, having been supplied through a line 9. The water vapor from this heat exchange is recovered through a line 10. Advantageously, the nest of tubes is situated under the inclined duct so that all the catalyst drawn off circulates through the tubes, from the top downwards. At the bottom end of the exchanger a fluidizing means 8 (ring or grid) introduces air in countercurrent to the direction of travel of the catalyst and maintains the catalyst in a dense bend through the nest of tubes.

The heated catalyst supply duct 6, inclined to an angle of 30° to 60° from the axis of the exchanger discharges into this exchanger at a junction point situated below the level 12 of the dense bed of the regenerator, for example at a point situated at a distance from the top end 14 of the exchanger comprised between one-quarter and one-third of its height so that in the upper part of the exchanger, the dense bed catalyst reaches a suitable level 13 which is a function of the respective fluidizing rates in the regenerator and the heat exchanger and therefore the respective volumetric masses. Thus there might be a slight difference in level of catalyst in the regenerator and in the exchanger.

The height of the exchanger is so chosen that in relation to this level in the regenerator, a free zone referred to as a clearance zone 15 of 1 to 2.5 m in the exchanger is designed to allow separation of any catalyst regeneration fumes an fluidization gas. A degassing line 17 extracts the fumes and gases from the dilute phase from the top end of the exchanger to the dilute fluidized phase 18 above the dense fluidized bed of the regenerator. Its diameter is so chosen that the ratio of the diameter of the degassing line to that of the catalyst inlet duct 6 is comprised between 3 and 6. The gas outlet velocity is generally 2 to 15 m/s.

Recycling means 19 comprise a catalyst extraction duct 20 connected to a Y or J junction 21. At the outlet from the exchanger, this duct 20 has a valve 23 for regulating the flow of hot catalyst drawn off through the duct 6 and which circulates in the exchanger. A cooled catalyst gas lift means 22 connected to the Y-junction accelerates the catalyst in a vertical duct 25 thanks to fluidizing air introduced through a line 24. The rate of flow of catalyst passes for instance from 1 to 2 m/s in the line 20, to 8 to 12 m/s in the duct 25. This duct 25 returns the catalyst to the dense bed 3 at a point situated above fluidizing air injection means and likewise contributes to regeneration of the catalyst which is achieved partly by the air brought in by the fluidizing air injection means and also by the fluidizing air raising the cooled catalyst in the dense bed. The catalyst, regenerated and cooled by 50 to centigrade degrees is finally recycled from the regenerator to a catalytic cracking unit via a recycling line 28.

Thermal control of regeneration is accomplished by a combination of the following elements:

Automatic control means 26 are connected to the valve 23 disposed on the catalyst extraction duct 20. The said means are furthermore connected to a temperature sensor 27 located in the dense bed of the regenerator. When the signal sent by the sensor attains a value greater than a preset value chosen as a function of the parameters of regeneration, stored by the control means, these latter send a signal to the valve 23 which increases the rate of extraction of catalyst and so increases the rate of admission of catalyst into the exchanger. This increase in the rate of flow contributes to a reduction in the regeneration temperature.

On the other hand, when the signal sent by the sensor reaches a value less than the desired value, the valve 23 is partially closed in order to reduce the heat exchange, which helps to raise the temperature of the catalyst in the regenerator. The following example is given by way of illustration:

Rate of flow of catalyst in the exchanger: 310,000 kg/h

Temperature of the dense bed of the regenerator: 740° C.

Outlet temperature from the exchanger: 525° C.

Quantity of fluidizing air in the exchanger: 1,400 kg/h

Height of the nest of (coiled) exchange tubes: 5.8 m

Height of the clearance zone: 2.5 m

Quantity of heat exchanged: $8.4 \times 10^7$ kJ/h

Rate of flow of generated steam: 49,530 kg/h

Temperature of the steam: 255° C.

Pressure of the steam: 41.7 bar

We claim:

1. A method of fluidized bed regeneration of a catalyst contaminated by coke deposited on it, comprising the following stages:
   (a) in at least one regeneration zone and under dense bed regeneration conditions, regenerating the contaminated catalyst and the at least partially cooled recycled catalyst from stage (f) in the presence of a regenerating gas containing oxygen, resulting in regenerated catalyst and fumes, said regenerating gas being injected in said regeneration zone through an injector disposed in said regeneration zone;
   (b) discharging at least a part of the catalyst contained in the regeneration zone and some of the fumes through a downwardly inclined duct into an external heat exchange zone of a suitable height, said duct communicating the dense bed of the regeneration zone with the heat exchange zone at a junction so disposed that from the bottom end of the external heat exchange zone to a level above the top of the said junction, a further dense bed of catalyst is established having an upper level of substantially the same height as the upper level of the catalyst in the regeneration zone and providing a clearance zone offering space above the said further dense bed at the top of the heat exchange zone;
   (c) cooling the discharged catalyst in the said dense bed of said external heat exchange zone under adequate fluidization and indirect heat exchange conditions, in the presence of fluidizing gas containing oxygen, while circulating the catalyst downwardly and countercurrently to the direction of flow of the fluidizing gas and wherein substantially all of the heat exchange is carried out below the said junction point communicating with the heat exchange zone;

(d) separating the catalyst from the fluidizing gas as well as any regeneration fumes in said space of the clearance zone, (e) withdrawing the said gases and fumes from the clearance zone in stage (d) and passing said gases and fumes to above the dense bed of the regeneration zone, and (f) recycling the cooled catalyst from the bottom part of the heat exchange zone to a conduit in the dense bed of the regenerator by a countercurrent injection of fluidizing gas containing oxygen into said conduit and withdrawing the recycled catalyst from said conduit in the regeneration zone at a level above said injector.

2. A method according to claim 1 in which the fluidization rate in the heat exchange zone is 0.025 m/s to 0.75 m/s.

3. A method according to claim 1 in which the rate of fluidization in the regeneration zone is between 0.6 and 1.5 m/s.

4. A method according to claim 1 in which the height of the heat exchange zone is such that the space available for clearance of the fluidizing gas corresponds to a height of 0.1 to 5 m above the level of the dense bed in the regeneration zone.

5. A method according to claim 1 in which the gas is extracted from the clearance zone at a velocity of 2 to 15 m/s.

6. A method according to claim 1 in which the rate of flow of catalyst is controlled by at least one valve downstream of the heat exchange zone.

7. A method according to claim 2, wherein the fluidization rate is between 0.05 and 0.30 m/s.

8. A method according to claim 3, wherein the fluidization rate is between 0.8 and 1.2 m/s.

9. A method according to claim 4, wherein the height is 1 to 2.5 m above the upper level of the dense bed in the regeneration zone.

10. A method according to claim 1, further comprising automatically adjusting the recycling rate in step (f) as a function of the temperature in the regeneration zone.

11. A method of fluidized bed regeneration of a catalyst contaminated by coke deposited on it, comprising the following stages:

(a) in at least one regeneration zone and under dense bed regeneration conditions, regenerating the contaminated catalyst and the at least partially cooled recycled catalyst from stage (f) in the presence of a regenerating gas containing oxygen, resulting in regenerated catalyst and fumes, said regenerating gas being injected in said regeneration zone through an injector disposed in said regeneration zone;

(b) discharging at least a part of the catalyst contained in the regeneration zone and some of the fumes through a downwardly inclined duct into an external heat exchange zone of a suitable height, said duct communicating the dense bed of the regeneration zone with the heat exchange zone at a junction so disposed that from the bottom end of the external heat exchange zone to a level above the top of the said junction, a further dense bed of catalyst is established having an upper level of substantially the same height as the upper level of the catalyst in the regeneration zone and providing a clearance zone offering space above the said further dense bed at the top of the heat exchange zone;

(c) cooling the discharged catalyst in the said dense bed of said external heat exchange zone under adequate fluidization and indirect heat exchange conditions, in the presence of fluidizing gas containing oxygen, while circulating the catalyst downwardly and countercurrently to the direction of flow of the fluidizing gas and wherein substantially all of the heat exchange is carried out below the said junction point communicating with the heat exchange zone;

(d) separating the catalyst from the fluidizing gas as well as any regeneration fumes in said space of the clearance zone, (e) withdrawing the said gases and fumes from the clearance zone in stage (d) and passing said gases and fumes to above the dense bed of the regeneration zone, and (f) recycling the cooled catalyst from the bottom part of the heat exchange zone to a conduit int he dense bed of the regenerator by a countercurrent injection of fluidizing gas containing oxygen into said conduit and withdrawing the recycled catalyst from said conduit in the regeneration zone at a level above said injector and wherein the rate of fluidization in the heat exchange zone is 0.025 m/s to 0.75 m/s and in the regeneration zone of between 0.6 and 1.5 m/s; and the height of the clearance zone corresponds to a height of 0.1 to 5 m above the level of the dense bed in the regeneration zone, and wherein the gas is extracted from the clearance zone at a velocity of 2 to 15 m/s; and further comprising automatically adjusting the recycling rate in stage (f) as a function of the temperature in the regeneration zone.

12. A method according to claim 11, wherein the fluidization rate in the heat exchange zone is 0.5 to 0.30 m/s, in the regeneration zone of between 0.8 and 1.2 m/s; the height of the clearance zone is 1 to 2.5 m above the level of the dense bed in the regeneration zone, and the gas is extracted from the clearance zone at a velocity of 5 to 8 m/s.

* * * * *

UNITED STATES PATENT AND TRADEMARK OFFICE
CERTIFICATE OF CORRECTION

PATENT NO. : 5,286,690
DATED : February 15, 1994
INVENTOR(S) : Frederic HOFFMANN et al.

It is certified that error appears in the above-indentified patent and that said Letters Patent is hereby corrected as shown below:

Column 3, line 16: Change "counter-current" to --co-current--.

Claim 1, column 7; line 15:
Change "counter-current" to --co-current--.

Claim 11, column 8; line 36:
Change "counter-current" to --co-current--.

Signed and Sealed this

Twenty-eighth Day of January, 1997

Attest:

BRUCE LEHMAN

*Attesting Officer*  *Commissioner of Patents and Trademarks*